United States Patent
Aoki et al.

(10) Patent No.: US 9,947,927 B2
(45) Date of Patent: Apr. 17, 2018

(54) PRODUCTION METHOD FOR NEGATIVE ELECTRODE FOR ALL-SOLID-STATE BATTERY, AND NEGATIVE ELECTRODE FOR ALL-SOLID-STATE BATTERY

(71) Applicant: Kureha Corporation, Tokyo (JP)

(72) Inventors: Kenta Aoki, Tokyo (JP); Shota Kobayashi, Tokyo (JP); Tatsuya Yaguchi, Tokyo (JP); Hiroshi Imoto, Tokyo (JP); Yasuhiro Tada, Tokyo (JP); Naohiro Sonobe, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/300,356

(22) PCT Filed: Mar. 31, 2015

(86) PCT No.: PCT/JP2015/060075
§ 371 (c)(1),
(2) Date: Sep. 29, 2016

(87) PCT Pub. No.: WO2015/152215
PCT Pub. Date: Oct. 8, 2015

(65) Prior Publication Data
US 2017/0141395 A1    May 18, 2017

(30) Foreign Application Priority Data
Mar. 31, 2014    (JP) .................................. 2014-074107

(51) Int. Cl.
*H01M 4/587* (2010.01)
*H01M 4/133* (2010.01)
(Continued)

(52) U.S. Cl.
CPC ........... *H01M 4/587* (2013.01); *H01M 4/043* (2013.01); *H01M 4/133* (2013.01);
(Continued)

(58) Field of Classification Search
CPC .... H01M 4/587; H01M 4/133; H01M 4/1393; H01M 4/043; H01M 4/366; H01M 4/622;
(Continued)

(56) References Cited

U.S. PATENT DOCUMENTS

| 5,587,255 A | 12/1996 | Sonobe et al. |
| 5,616,436 A | 4/1997 | Sonobe et al. |

(Continued)

FOREIGN PATENT DOCUMENTS

| CN | 103329334 A | 9/2013 |
| EP | 0613197 A1 | 8/1994 |

(Continued)

OTHER PUBLICATIONS

First Office Action for PCT/JP2015/060075/CN201580017408.2 dated Jan. 24, 2017, by the State Intellectual Property Office of China.

(Continued)

*Primary Examiner* — Jane Rhee
(74) *Attorney, Agent, or Firm* — Birch, Stewart, Kolasch & Birch, LLP

(57) ABSTRACT

An object of the present invention is to provide a production method for suppressing the deformation of a negative electrode in the production of a negative electrode for an all-solid-state battery using turbostratic carbon and a solid electrolyte.
The problem described above can be solved by a production method for a negative electrode for an all-solid-state battery comprising the steps of:

(Continued)

(1) coating a carbonaceous material having a true density of from 1.30 g/cm$^3$ to 2.10 g/cm$^3$ determined by a butanol method with a solid electrolyte; and
(2) pressure-molding the solid electrolyte-coated carbonaceous material.

4 Claims, 1 Drawing Sheet

(51) Int. Cl.
| | |
|---|---|
| H01M 4/1393 | (2010.01) |
| H01M 10/0562 | (2010.01) |
| H01M 4/04 | (2006.01) |
| H01M 4/36 | (2006.01) |
| H01M 4/62 | (2006.01) |
| H01M 10/0525 | (2010.01) |
| H01M 10/052 | (2010.01) |
| H01M 4/02 | (2006.01) |

(52) U.S. Cl.
CPC ......... *H01M 4/1393* (2013.01); *H01M 4/366* (2013.01); *H01M 4/62* (2013.01); *H01M 10/0525* (2013.01); *H01M 10/0562* (2013.01); *H01M 10/052* (2013.01); *H01M 2004/027* (2013.01); *H01M 2220/20* (2013.01); *H01M 2300/0068* (2013.01)

(58) Field of Classification Search
CPC ............... H01M 4/62; H01M 10/0562; H01M 10/0525; H01M 10/052; H01M 2004/027; H01M 2220/20; H01M 2300/0068
See application file for complete search history.

(56) References Cited

U.S. PATENT DOCUMENTS

| | | | |
|---|---|---|---|
| 6,335,122 | B1 | 1/2002 | Yamada et al. |
| 6,884,546 | B1 * | 4/2005 | Fujita ............... H01M 4/587 429/231.4 |
| 7,858,239 | B2 | 12/2010 | Shimizu et al. |
| 9,537,176 | B2 | 1/2017 | Kobayashi et al. |
| 2009/0297953 | A1 | 12/2009 | Shimizu et al. |
| 2012/0156571 | A1 | 6/2012 | Kawamoto et al. |
| 2013/0302698 | A1 | 11/2013 | Goto et al. |
| 2015/0162614 | A1 | 6/2015 | Koshika et al. |
| 2015/0180020 | A1 | 6/2015 | Komatsu et al. |

FOREIGN PATENT DOCUMENTS

| | | |
|---|---|---|
| EP | 2869371 A1 | 5/2015 |
| JP | H05275077 A | 10/1993 |
| JP | H0864207 A | 3/1996 |
| JP | H09330717 A | 12/1997 |
| JP | H10284089 A | 10/1998 |
| JP | 2009200014 A | 9/2009 |
| JP | 2009283344 A | 12/2009 |
| JP | 2012146506 A | 8/2012 |
| JP | 2013214421 A | 10/2013 |
| JP | 2013-239267 A | 11/2013 |
| KR | 10-2008-0042858 A | 5/2008 |
| WO | WO 98/44580 A1 | 10/1998 |
| WO | WO 01/22519 A1 | 3/2001 |
| WO | WO 2011/086689 A1 | 7/2011 |
| WO | 2012099178 A1 | 7/2012 |
| WO | WO2014002483 A1 | 1/2014 |
| WO | WO2014038492 A1 | 3/2014 |
| WO | WO2014038494 A1 | 3/2014 |

OTHER PUBLICATIONS

Search Report for PCT/JP2015/060075/CN201580017408.2 dated Jan. 24, 2017, by the State Intellectual Property Office of China.
First Office Action for PCT/JP2015/060075/KR10-2016-7026970 dated Feb. 6, 2017, by the Korean Intellectual Property Office.
Translation of First Office Action for PCT/JP2015/060075/CN201580017408.2 dated Jan. 24, 2017, from the State Intellectual Property Office, People's Republic of China.
Translation of Search Report for PCT/JP2015/060075/CN201580017408.2 dated Jan. 17, 2017, from the State Intellectual Property Office, People's Republic of China.
Translation of Office Action for PCT/JP2015/060075/KR10-2016-7026970 dated Feb. 6, 2017, from Korean Intellectual Property Office.
International Search Report of PCT/JP2015/060075 dated Jul. 7, 2015.
Extended European Search Report for PCT/JP2015/060075 dated Dec. 8, 2016.
Written Opinion of the International Searching Authority for PCT/JP2015/060075 dated Jul. 7, 2015.
Chinese Office Action for Chinese Application No. 201580017408.2, dated Jul. 12, 2017, with an English translation.
Extended European Search Report for European Application No. 15772398.2, dated Dec. 23, 2016.
International Search Search Report (Form PCT/ISA/210) for International Application No. PCT/JP2015/060074, dated Jul. 7, 2015, with an English translation.
Japanese Office Action for Japanese Application No. 2016-511917, dated May 9, 2017, with an English translation.
Japanese Office Action for Japanese Application No. 2016-511918, dated Jan. 10, 2017, with an English translation.
Taiwanese Office Action and Search Report for Taiwanese Application No. 104110547, dated Jun. 20, 2016, with English translations.
Taiwanese Office Action and Search Report for Taiwanese Application No. 104110548, dated Aug. 18, 2016, with English translations.
Written Opinion of the International Searching Authority (Forms PCT/ISA/237 and PCT/IB/373) for International Application No. PCT/JP2015/060074, dated Jul. 7, 2017, with an English translation.
Chinese Notification of the Third Office Action (including an English translation thereof) issued in the corresponding Chinese Patent Application No. 201580017408.2 dated Oct. 30, 2017.
European Patent Office Communication pursuant to Article 94(3) EPC issued in the corresponding European Patent Application No. 15772398.2 dated Nov. 22, 2017.
Japanese Office Action and English translation for Application No. 2016-511917, dated Jan. 9, 2018.
Korean Office Action and English translation for Application No. 10-2016-7027201, dated Jan. 18, 2018.

* cited by examiner

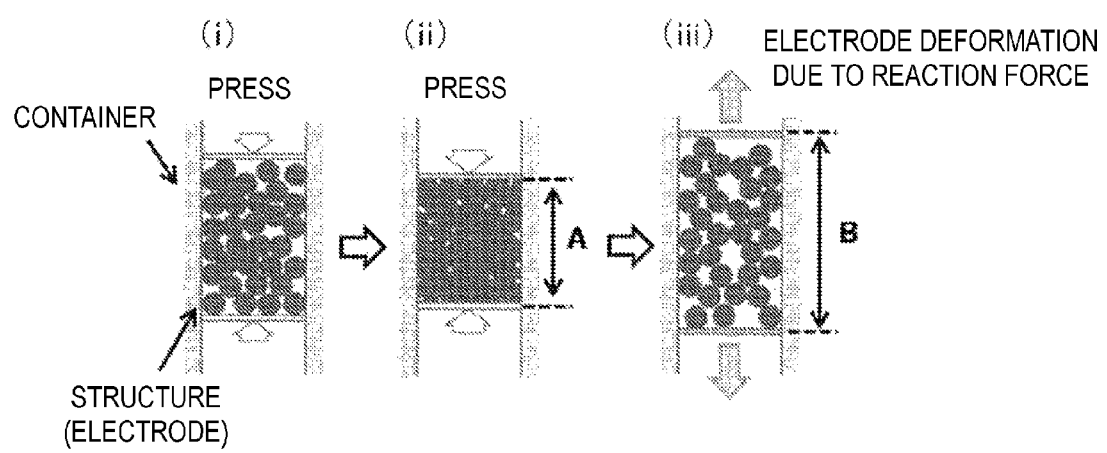

PRODUCTION METHOD FOR NEGATIVE ELECTRODE FOR ALL-SOLID-STATE BATTERY, AND NEGATIVE ELECTRODE FOR ALL-SOLID-STATE BATTERY

TECHNICAL FIELD

The present invention relates to a production method for a negative electrode for an all-solid-state battery, and a negative electrode for an all-solid-state battery. With the present invention, it is possible to produce a negative electrode having controlled gaps between a negative electrode material and a solid electrolyte.

BACKGROUND ART

In recent years, the notion of mounting large lithium-ion secondary batteries, having high energy density and excellent output energy characteristics, in electric vehicles has been investigated in response to increasing concern over environmental issues. In small mobile device applications such as mobile telephones or laptop computers, the capacity per unit volume is important, so graphitic materials with a large density have primarily been used as active material for negative electrodes. However, lithium-ion secondary batteries for automobiles are difficult to replace at an intermediate stage due to their large size and high cost. Therefore, durability is required to be the same as that of an automobile, so there is a demand for the realization of a life span of at least 10 years (high durability). When graphitic materials or carbonaceous materials with a developed graphite structure are used, there is a tendency for damage to occur due to crystal expansion and contraction caused by repeated lithium doping and de-doping, which diminishes the charging and discharging repetition performance. Therefore, such materials are not suitable as negative electrode materials for lithium-ion secondary batteries for automobiles which require high cycle durability. In contrast, turbostratic carbon, which does not have a graphite structure and has a structure in which the carbon hexagonal plane does not have three-dimensional regularity, is suitable for use in automobile applications from the perspective of involving little particle expansion and contraction due to lithium doping and de-doping reactions in comparison to graphite and having high cycle durability (Patent Document 1). In addition, turbostratic carbon has a gentle charging and discharging curve in comparison to graphitic materials, and the potential difference with charge restriction is larger, even when rapid charging that is more rapid than the case where graphitic materials are used as negative electrode active materials is performed, so turbostratic carbon has the feature that rapid charging is possible. Furthermore, since non-graphitizable carbon has lower crystallinity and more sites capable of contributing to charging and discharging than graphitic materials, non-graphitizable carbon is also characterized by having excellent rapid charging and discharging (input/output) characteristics.

CITATION LIST

Patent Literature

Patent Document 1: Japanese Unexamined Patent Application Publication No. H08-064207A
Patent Document 2: Japanese Unexamined Patent Application Publication No. 2009-283344A
Patent Document 3: Japanese Unexamined Patent Application Publication No. 2012-146506A

SUMMARY OF INVENTION

Technical Problem

Currently marketed lithium batteries using non-graphitizable carbon use nonaqueous electrolyte solutions containing combustible organic solvents. Therefore, there are concerns about abnormal heat generation due to increases in temperature at the time of a short circuit and ignition due to heat generation, and the safety cannot be considered high. In contrast, all-solid-state batteries, in which the electrolyte solution is replaced with a solid electrolyte layer so as to make the battery completely solid, are excellent from the perspective of safety in that the likelihood of ignition is reduced since a combustible organic electrolyte solution is not used.

For example, Patent Document 2 discloses a production method for a negative electrode mixture for a lithium battery, wherein a carbon material and a solid electrolyte are mixed by means of mechanochemical treatment. In addition, Patent Document 3 discloses an all-solid-state battery wherein graphite and amorphous carbon are used as negative electrode active materials.

The present inventors attempted to create a negative electrode using turbostratic carbon and a solid electrolyte. However, when a negative electrode for an all-solid-state battery was produced by simply mixing turbostratic carbon and a solid electrolyte, it became clear that the negative electrode deforms due to the repulsion of the turbostratic carbon after pressure molding.

An object of the present invention is to provide a production method for suppressing the deformation of a negative electrode in the production of a negative electrode for an all-solid-state battery using turbostratic carbon and a solid electrolyte.

Solution to Problem

As a result of conducting dedicated research on the production of a negative electrode using turbostratic carbon and a solid electrolyte, the present inventors made the surprising discovery that a negative electrode produced by a pressure molding method by coating turbostratic carbon with a solid electrolyte and using the turbostratic carbon coated with the solid electrolyte has a reduced negative electrode deformation ratio.

The present invention is based on such knowledge. Accordingly, the present invention relates to the following:

[1] a production method for a negative electrode for an all-solid-state battery comprising the steps of: (1) coating a carbonaceous material having a true density of from 1.30 g/cm$^3$ to 2.10 g/cm$^3$ determined by a butanol method with a solid electrolyte; and (2) pressure-molding the solid electrolyte-coated carbonaceous material;

[2] the production method for a negative electrode for an all-solid-state battery according to [1], wherein a volume ratio of the carbonaceous material and the solid electrolyte is from 20:80 to 99:1;

[3] the production method for a negative electrode for an all-solid-state battery according to [1] or [2], wherein the carbonaceous material has an average surface spacing of a 002 surface of from 0.340 to 0.400 nm determined by powder X-ray diffraction, a $L_{c(002)}$ of from 0.5 to 10 nm, and an average particle size $D_{v50}$ of from 1 to 50 μm;

[4] the production method for a negative electrode for an all-solid-state battery according to any one of [1] to [3], wherein the carbonaceous material is a carbonaceous material having an exothermic peak temperature T (° C.) according to differential thermal analysis and a butanol true density $\rho_{Bt}$ (g/cm$^3$) satisfying the following formula (1):

$$300 \leq T - 100 \times \rho_{Bt} \leq 570 \quad (1);$$

[5] a negative electrode for an all-solid-state battery obtained by the production method according to any one of [1] to [4]; or

[6] an all-solid-state battery containing the negative electrode for an all-solid-state battery according to [5].

Advantageous Effects of Invention

With the production method for a negative electrode for an all-solid-state battery according to the present invention, it is possible to obtain a negative electrode using turbostratic carbon and a solid electrolyte, wherein the repulsion of the turbostratic carbon after pressure molding is suppressed, and the deformation ratio of the negative electrode is small. In a negative electrode having a small deformation ratio, peeling between the turbostratic carbon and the solid electrolyte is suppressed, and the formation of gaps is also suppressed. Accordingly, decreases in the input/output properties arising due to gaps between the turbostratic carbon and the solid electrolyte are suppressed. As a result, an all-solid-state battery using a negative electrode for an all-solid-state battery obtained by the production method for a negative electrode for an all-solid-state battery according to the present invention exhibits excellent input/output properties.

BRIEF DESCRIPTION OF THE DRAWINGS

FIG. 1 schematically illustrates electrode deformation ratio as an indication of the effect of the present invention.

DESCRIPTION OF EMBODIMENTS

[1] Production Method for a Negative Electrode for an all-solid-state Battery

The production method for a negative electrode for an all-solid-state battery according to the present invention comprises the steps of: (1) coating a carbonaceous material having a true density of from 1.30 g/cm$^3$ to 2.10 g/cm$^3$ determined by a butanol method with a solid electrolyte; and (2) pressure-molding the solid electrolyte-coated carbonaceous material.

(Carbonaceous Material)
(Raw Material of the Carbonaceous Material)

The carbonaceous material used in the production method of the present invention is not limited as long as the carbonaceous material is turbostratic carbon and has a true density of from 1.30 g/cm$^3$ to 2.10 g/cm$^3$ determined by a butanol method, but a preferred mode is non-graphitizable carbon having a true density of not less than 1.30 g/cm$^3$ and not greater than 1.70 g/cm$^3$ determined by a butanol method, and another preferred mode is an easily graphitizable carbon having a true density of greater than 1.70 g/cm$^3$ and not greater than 2.10 g/cm$^3$ determined by a butanol method.

The carbon source of the non-graphitizable carbon or the easily graphitizable carbon is not limited as long as non-graphitizable carbon or easily graphitizable carbon can be produced, and examples include petroleum pitch, coal pitch, thermoplastic resins (for example, ketone resins, polyvinyl alcohol, polyethylene terephthalate, polyacetal, polyacrylonitrile, styrene/divinylbenzene copolymers, polyimide, polycarbonate, modified polyphenylene ether, polybutylene terephthalate, polyarylate, polysulfone, polyphenylene sulfide, polyimide resins, fluororesins, polyamideimide, or polyetheretherketone), and thermosetting resins (for example, epoxy resins, urethane resins, urea resins, diallylphthalate resins, polyester resins, polycarbonate resins, silicon resins, polyacetal resins, nylon resins, furan resins, or aldehyde resins (for example, phenol resins, melamine resins, amino resins, and amide resins)). Note that a petroleum pitch, a coal pitch, or a thermoplastic resin can be used as a carbon source for non-graphitizable carbon by being infusibilized by oxidation treatment or the like.

(Average Surface Spacing of the 002 Surface)

The average surface spacing of the (002) surface of a carbonaceous material indicates a value that decreases as the crystal integrity increases. The spacing of an ideal graphite structure yields a value of 0.3354 nm, and the value tends to increase as the structure is disordered. Accordingly, the average surface spacing is effective as an index indicating the carbon structure.

The average surface spacing of the (002) surface of the carbonaceous material used in the production method of the present invention, which is measured by X-ray diffraction, is not limited but is preferably from 0.340 to 0.400 nm, more preferably not less than 0.350 nm and not greater than 0.400 nm, and particularly preferably not less than 0.355 nm and not greater than 0.400 nm. A carbonaceous material having an average surface spacing of less than 0.340 nm may have poor cycle characteristics.

(Crystallite Thickness $L_{c(002)}$ in the C-axis Direction)

The crystallite thickness $L_{c(002)}$ in the c-axis direction of the carbonaceous material used in the production method of the present invention is preferably from 0.5 to 10.0 nm. The upper limit of $L_{c(002)}$ is preferably not greater than 8.0 nm and more preferably not greater than 5.0 nm. When $L_{c(002)}$ exceeds 10.0 nm, the volume expansion and contraction accompanying lithium doping and de-doping may become large. As a result, the carbon structure may be ruined, and lithium doping and de-doping may be obstructed, which may lead to poor repetition characteristics.

(Specific Surface Area)

The specific surface area may be determined with an approximation formula derived from a BET formula based on nitrogen adsorption. The specific surface area of the carbonaceous material used in the negative electrode for an all-solid-state battery according to the present invention is not limited but is preferably from 0.5 to 50 m$^2$/g. The upper limit of the BET specific surface area is preferably not greater than 45 m$^2$/g, more preferably not greater than 40 m$^2$/g, and even more preferably not greater than 35 m$^2$/g. The lower limit of the BET specific surface area is preferably not less than 1 m$^2$/g. When the specific surface area exceeds 50 m$^2$/g, decomposition reactions with the solid electrolyte increase, which may lead to an increase in irreversible capacity and therefore a decrease in battery performance. On the other hand, when the BET specific surface area is less than 0.5 m$^2$/g and the material is used as a negative electrode for an all-solid-state battery, there is a risk that the input/output characteristics may be diminished due to a decrease in the reaction area with the solid electrolyte.

(True Density Determined by a Butanol Method)

The true density of a graphitic material having an ideal structure is 2.27 g/cm$^3$, and the true density tends to decrease as the crystal structure becomes disordered. Accordingly, the true density can be used as an index expressing the carbon structure.

The true density of the carbonaceous material used in the negative electrode for an all-solid-state battery according to the present invention is from 1.30 g/cm³ to 2.10 g/cm³. The upper limit of the true density is preferably not greater than 2.05 g/cm³ and more preferably not greater than 2.00 g/cm³. The lower limit of the true density is preferably not less than 1.31 g/cm³, more preferably not less than 1.32 g/cm³, and even more preferably not less than 1.33 g/cm³. Further, the lower limit of the true density may be not less than 1.40 g/cm³. A carbonaceous material having a true density exceeding 2.10 g/cm³ has a small number of pores of a size capable of storing lithium, and the doping and de-doping capacity is also small. Thus, this is not preferable. In addition, increases in true density involve the selective orientation of the carbon hexagonal plane, so the carbonaceous material often undergoes expansion and contraction at the time of lithium doping and de-doping, which is not preferable. On the other hand, a carbon material having a true density of less than 1.30 g/cm³ may have a large number of closed pores, and the doping and de-doping capacity may be reduced, which is not preferable. Furthermore, the electrode density decreases and thus causes a decrease in the volume energy density, which is not preferable.

Note that in this specification, "non-graphitizable carbon" is a general term for non-graphitizable carbon which typically does not transform into a graphite structure even when heat-treated at an ultra-high temperature of approximately 3,000° C., but a carbonaceous material having a true density of not less than 1.30 g/cm³ and not greater than 1.70 g/cm³ is called a non-graphitizable carbon here.

Note that in this specification, "easily graphitizable carbon" is a general term for non-graphitic carbon which typically transforms into a graphite structure when heat-treated at a high temperature of approximately 2,000° C., but a carbonaceous material having a true density of not less than 1.70 g/cm³ and not greater than 2.10 g/cm³ is called an easily graphitizable carbon here.

(Average Particle Size $D_{v50}$)

The average particle size ($D_{v50}$) of the carbonaceous material used in the production method of the present invention is preferably from 1 to 50 µm. The lower limit of the average particle size is preferably not less than 1 µm, more preferably not less than 1.5 µm and particularly preferably not less than 2.0 µm. When the average particle size is less than 1 µm, the fine powder increases and the specific surface area increases. The reactivity with a solid electrolyte increases, and the irreversible capacity, which is a capacity that is charged but not discharged, also increases, and the percentage of the positive electrode capacity that is wasted thus increases. Thus, this is not preferable. The upper limit of the average particle size is preferably not greater than 40 µm and more preferably not greater than 35 µm. When the average particle size exceeds 50 µm, the diffusion free path of lithium within particles increases, which makes rapid charging and discharging difficult.

(Relationship between the Exothermic Peak Temperature T (° C.) and the Butanol True Density $\rho_{Bt}$ (g/cm³))

The carbonaceous material used in the negative electrode for an all-solid-state battery according to the present invention is not limited but is preferably a carbonaceous material in which the exothermic peak temperature T (° C.) according to differential thermal analysis and the butanol true density $\rho_{Bt}$ (g/cm³) satisfy the following formula (1):

$$300 \leq T - 100 \times \rho_{Bt} \leq 650 \quad (1).$$

An exothermic peak typically refers to a change in response to the size of a carbon hexagonal plane of the carbonaceous material and the three-dimensional order thereof. A peak tends to appear on the high-temperature side for a larger carbon hexagonal plane and a higher three-dimensional order. Since such a carbonaceous material has a high three-dimensional order, the true density $\rho_{Bt}$ measured with a butanol method is also high. For example, a graphite material having a large carbon hexagonal plane and having an surface spacing of 0.3354 nm exhibits an exothermic peak temperature of nearly 800° C. Such a carbonaceous material tends to be susceptible to crystal expansion and contraction due to repeated lithium doping and de-doping, and the charge/discharge repetition performance is poor.

On the other hand, a peak typically tends to appear on the low-temperature side for a smaller carbon hexagonal plane and a lower three-dimensional order. Such a carbonaceous material involves smaller crystal expansion and contraction due to repeated lithium doping and de-doping than graphite and exhibits high cycle durability. However, when the exothermic peak appears excessively on the low temperature side, the amount of fine pores or the fine pore size becomes excessively large, and the specific surface area is high, which leads to increases in irreversible capacity and is therefore not preferable. In addition, since the amount of fine pores in the carbonaceous material is large, the true density $\rho_{Bt}$ measured with a butanol method becomes excessively low, which is not preferable from the perspective of the volume energy density.

As a result of conducting dedicated research on the relationship between the exothermic peak temperature T, the true density $\rho_{Bt}$ measured with a butanol method, and a carbonaceous material involving small crystal expansion and contraction, it was determined that when the carbonaceous material has an exothermic peak temperature T and a true density $\rho_{Bt}$ measured with a butanol method satisfying the relationship $300 \leq T - 100 \times \rho_{Bt} \leq 650$, the crystal expansion and contraction are smaller than in the case of graphite, and high cycle durability can be anticipated. The carbonaceous material of the present invention preferably has an exothermic peak temperature T and a true density $\rho_{Bt}$ measured with a butanol method satisfying the relationship $305 \leq T - 100 \times \rho_{Bt} \leq 650$ and more preferably $310 \leq T - 100 \times \rho_{Bt} \leq 650$. In addition, the lower limit of $T - 100 \times \rho_{Bt}$ of the carbonaceous material of the present invention may be 430.

(Solid Electrolyte)

The solid electrolyte material that can be used in the production method for a negative electrode for an all-solid-state battery according to the present invention is not limited to a material used in the field of lithium-ion secondary batteries, and a solid electrolyte material comprising an organic compound, an inorganic compound, or a mixture thereof may be used. The solid electrolyte material has ionic conductivity and insulating properties. A specific example is a polymer electrolyte (for example, a true polymer electrolyte), a sulfide solid electrolyte material, or an oxide solid electrolyte material, but a sulfide solid electrolyte material is preferable.

Examples of true polymer electrolytes include polymers having ethylene oxide bonds, crosslinked products thereof, copolymers thereof, and polyacrylonitrile- and polyacrylonitrile-based polymers, examples of which include polyethylene oxide, polyethylene carbonate, and polypropylene carbonate.

Examples of sulfide solid electrolyte materials include $Li_2S$, $Al_2S_3$, $SiS_2$, $GeS_2$, $P_2S_3$, $P_2S_5$, $As_2S_3$, $Sb_2S_3$, and mixtures and combinations thereof. That is, examples of sulfide solid electrolyte materials include $Li_2S$—$Al_2S_3$ materials, $Li_2S$—$SiS_2$ materials, $Li_2S$—$GeS_2$ materials, $Li_2S$—$P_2S_3$ materials, $Li_2S$—$P_2S_5$ materials, $Li_2S$—$As_2S_3$ materials, $Li_2S$—$Sb_2S_3$ materials, and $Li_2S$ materials, and $Li_2S$—$P_2S_5$ materials are particularly preferable. Further, $Li_3PO_4$, halogens, or halogenated compounds may be added to these solid electrolyte materials and used as solid electrolyte materials.

Examples of oxide solid electrolyte materials include oxide solid electrolyte materials having a perovskite-type, NASICON-type, or garnet-type structure, examples of which include $La_{0.51}LiTiO_{2.94}$, $Li_{1.3}Al_{0.3}Ti_{1.7}(PO_4)_3$, $Li_7La_3Zr_2O_{12}$, and the like.

The shape of the solid electrolyte material is not limited as long as the material functions as an electrolyte. The average particle size of the solid electrolyte material is also not particularly limited but is preferably from 0.1 μm to 50 μm.

The lithium ion conductivity of the solid electrolyte material is not limited as long as the effect of the present invention can be achieved, but the lithium ion conductivity is preferably not less than $1\times10^{-6}$ S/cm and more preferably not less than $1\times10^{-5}$ S/cm.

The $Li_2S$—$P_2S_5$ material described above can also be produced from $Li_2S$ and $P_2S_5$ or may be produced using $Li_2S$, a simple substance phosphorus, and a simple substance sulfur. The $Li_2S$ that is used may be a substance that is produced and marketed industrially but may also be produced with the following methods. Specific examples include: a method of producing hydrous $Li_2S$ by reacting lithium hydroxide and hydrogen sulfide at 0 to 150° C. in an aprotic organic solvent and then dehydrosulfurizing the reaction solution at 150 to 200° C. (see Japanese Unexamined Patent Application Publication No. H7-330312A); a method of producing $Li_2S$ directly by reacting lithium hydroxide and hydrogen sulfide at 150 to 200° C. in an aprotic organic solvent (see Japanese Unexamined Patent Application Publication No. H7-330312A); and a method of reacting lithium hydroxide and a gaseous sulfur source at a temperature of from 130 to 445° C. (see Japanese Unexamined Patent Application Publication No. H9-283156A). The aforementioned $P_2S_5$ that is used may also be a substance that is produced and marketed industrially. In addition, a simple substance phosphorus and simple substance sulfur may also be used instead of $P_2S_5$. The simple substance phosphorus and simple substance sulfur that are used may also be substances that are produced and marketed industrially.

A $Li_2S$—$P_2S_5$ material can be produced with a melt-quenching method or a mechanical milling method using the aforementioned $P_2S_5$ and $Li_2S$. An electrolyte material obtained with these methods is a sulfurized glass and is amorphized. A solid electrolyte can be produced by mixing $P_2S_5$ and $Li_2S$ at a molar ratio of from 50:50 to 80:20, for example, and preferably from 60:40 to 75:25. In the case of melt-quenching, a mixture prepared in a pellet form with a mortar is placed in a carbon-coated quartz tube and vacuum-sealed. The mixture is then reacted for 0.1 to 12 hours at 400° C. to 1,000° C. An amorphous solid electrolyte can be obtained by charging the obtained reaction product into ice and rapidly cooling the reaction product. In the case of a mechanical milling method, a reaction can be performed at room temperature. For example, an amorphous solid electrolyte can be obtained by performing treatment using a planetary ball mill for 0.5 to 100 hours at a revolution speed of from several tens to several hundreds of revolutions per minute.

[1] Coating Step

The production method of the present invention includes a step of coating the carbonaceous material with a solid electrolyte. The volume ratio of the carbonaceous material and the solid electrolyte is not limited as long as the effect of the present invention can be achieved, but the volume ratio is from 20:80 to 99:1 and more preferably from 30:70 to 97:3.

In addition, the amount of the solid electrolyte added to the carbonaceous material is not limited as long as the effect of the present invention can be achieved but is preferably from 400 vol. % to 1 vol. %, more preferably from 300 vol. % to 3 vol. %, even more preferably from 250 vol. % to 5 vol. %, and even more preferably from 200 vol. % to 10 vol. % with respect to the volume of the carbonaceous material.

The coating method of the coating step is not limited, but examples include a method of dissolving or dispersing a solid electrolyte with a solvent, mixing the solution with a carbonaceous material, and then coating by means of heating and/or drying, a method of coating using a sol-gel method, a method of coating using a ball mill or a bead mill, a method of coating using a kneading machine such as a pressure kneader or a kneader, a method of coating using a vibrating mill, and a method of coating using a jet mill. A method of dissolving or dispersing a solid electrolyte with a solvent, mixing the solution with a carbonaceous material, and then coating by means of heating and/or drying, a method of coating using a ball mill or a bead mill, or a sol-gel method is preferable.

In a method of dissolving or dispersing a solid electrolyte with a solvent, mixing the solution with a carbonaceous material, and then coating by means of heating and/or drying, the surface of the carbonaceous material is coated with the solid electrolyte by mixing and dispersing the carbonaceous material and the solid electrolyte in a solvent and then removing the solvent. The solvent that is used is not particularly limited as long as the solvent is capable of dissolving or dispersing the solid electrolyte, but examples include water, methanol, ethanol, n-propanol, n-butanol, acetone, heptane, N-methylformamide (NMF), dimethylformamide (DMF), dimethylsulfoxide (DMSO), and N-methylpyrrolidone (NMP), and water, methanol, ethanol, heptane, N-methylformamide (NMF), or N-methylpyrrolidone (NMP) is preferable from the perspective of the solubility of the solid electrolyte.

In a method of coating using a ball mill or a bead mill, the surface of the carbonaceous material is coated with the solid electrolyte by mixing, mixing and dispersing, or mixing, dispersing, and pulverizing the carbonaceous material and the solid electrolyte with a ball mill or a bead mill, and the carbonaceous material and the solid electrolyte are preferably mixed and dispersed or mixed, dispersed, and pulverized. The setting conditions of the ball mill or the bead mill are not particularly limited as long as the effect of the present invention can be achieved. For example, the revolution speed of the ball mill or the bead mill may be from 200 to 1,000 rpm, for example, and is preferably from 300 to 800 rpm. In addition, the setting time of the ball mill or the bead mill may be from 30 to 600 minutes, for example, and is preferably from 60 to 480 minutes.

A method of coating using a sol-gel method is a method of synthesizing a solid electrolyte on the surface of a carbonaceous material by simultaneously mixing the carbonaceous material when synthesizing the solid electrolyte with a sol-gel method. The setting conditions in the sol-gel method are not particularly limited as long as the effect of the present invention can be achieved.

[2] Pressure Molding Step

The production method of the present invention includes a step of pressure-molding the carbonaceous material coated with the solid electrolyte. A conventionally known method can be used for the pressure molding operation, and the pressure molding operation is not particularly limited. The pressure at the time of pressure molding is not particularly limited but may be from 0.5 to 600 MPa, for example, preferably from 1.0 to 600 MPa, and more preferably from 2.0 to 600 MPa.

Further, a negative electrode for an all-solid-state battery obtained with the production method of the present invention may contain negative electrode materials, conductivity agents, and/or binders other than the aforementioned carbonaceous material as long as the effect of the present invention can be achieved. Negative electrode materials, conductivity agents, and/or binders may be added in the production method of the present invention.

(Mechanism of the Present Invention)

In the production method of the present invention, by coating the carbonaceous material with the solid electrolyte in the coating step of step (1) described above, it is possible to obtain a negative electrode in which the repulsion of the carbonaceous material after pressure molding is suppressed, and the deformation ratio of the negative electrode is small. The reason that a negative electrode having a small negative electrode deformation ratio can be obtained with the production method of the present invention is not completely understood but may be as follows. However, the present invention is not limited to the following description.

As illustrated in FIG. 1, the carbonaceous material used in the present invention has high particle strength, so when a negative electrode is produced using the carbonaceous material and a solid electrolyte, there are contact points (forming bridges) between the particles of the carbonaceous material, and a reaction force is generated in the perpendicular direction at the time of pressure molding (FIG. 1(*ii*)). When the pressure due to this pressurization is released, the groups of particles forming contact points release the pressure and attempt to form a stable structure. Therefore, the material deforms in the opposite direction as the load direction, and the thickness of the electrode becomes large (FIG. 1(*iii*)). Peeling then occurs between the carbonaceous material and the solid electrolyte, and gaps are formed, which may diminish the input/output properties. When a carbonaceous material and a solid electrolyte having a different modulus of elasticity are simply mixed, as described above, the carbonaceous material forms bridges within the electrode, which may cause the wraparound of the solid electrolyte into the gaps of the carbonaceous material particles to be poor. On the other hand, in the production method of the present invention, since the surface of the carbonaceous material is coated with the solid electrolyte, the carbonaceous material is unlikely to form bridges, which may facilitate the wraparound of the solid electrolyte into the particles gaps. As a result, the reaction force of the carbonaceous material after pressure molding is suppressed. In addition, the electrode deformation ratio may be improved since the solid electrolyte having a lower modulus of elasticity than the carbonaceous material reduces the reaction force.

[2] Negative Electrode for an All-solid-state Battery

The negative electrode for an all-solid-state battery according to the present invention is obtained by the production method described above. That is, the negative electrode for an all-solid-state battery according to the present invention contains: a carbonaceous material having a true density of from 1.30 g/cm$^3$ to 2.10 g/cm$^3$ determined by a butanol method; and a solid electrolyte. Specifically, the carbonaceous materials and solid electrolytes include the carbonaceous materials and solid electrolytes described in "[1] Production method for a negative electrode for an all-solid-state battery" above.

The negative electrode for an all-solid-state battery according to the present invention involves little peeling between the carbonaceous material and the solid electrolyte. Therefore, there are no gaps within the carbonaceous material, and the input/output properties are enhanced.

[3] All-solid-state Battery

The all-solid-state battery of the present invention comprises the negative electrode for an all-solid-state battery described above. More specifically, the all-solid-state battery comprises a negative electrode active material layer, a positive electrode active material layer, and a solid electrolyte layer, and the negative electrode for an all-solid-state battery according to the present invention may be used as the negative electrode active material layer.

(Negative Electrode Active Material Layer)

The negative electrode active material layer comprises the negative electrode for an all-solid-state battery described above. That is, the negative electrode active material layer contains the carbonaceous material and the solid electrolyte material described above but may further contain a conductivity agent and/or a binder. The volume of the carbonaceous material in the negative electrode active material layer with respect to the total volume of the negative electrode active material layer is preferably from 20 vol. % to 80 vol. % and more preferably from 30 vol. % to 70 vol. %. For example, when the carbonaceous material is coated with the solid electrolyte at a volume ratio of 99:1, it is preferable to form the negative electrode active material layer by adding the solid electrolyte and the like so that the volume of the carbonaceous material with respect to the total volume of the negative electrode active material layer is from 20 vol. % to 80 vol. %.

The negative electrode active material layer may contain negative electrode materials other than the aforementioned carbonaceous material as long as the effect of the present invention can be achieved.

Examples of conductivity agents include acetylene black, Ketjen black, carbon nanofibers, carbon nanotubes, and carbon fibers. The content of the conductivity agent is not limited but may be from 0.5 to 15 wt. %, for example. An example of a binder is a fluorine-containing binder such as PTFE or PVDF. The content of the binder is not limited but may be from 0.5 to 15 wt. %, for example. The thickness of the negative electrode active material layer is not limited but is within the range of from 0.1 µm to 1,000 µm, for example.

The negative electrode active material layer ordinarily has a current collector. SUS, copper, nickel, or carbon, for example, can be used as a negative electrode current collector, but of these, Cu or SUS is preferable.

(Positive Electrode Active Material Layer)

The positive electrode active material layer contains a positive electrode active material and a solid electrolyte material and may further contain a conductivity agent and/or a binder. The mixing ratio of the positive electrode active material and the solid electrolyte in the positive electrode active material layer is not limited and may be determined appropriately as long as the effect of the present invention can be achieved.

The positive electrode active material can be used without limiting the positive electrode active material used in the all-solid-state battery. For example, layered oxide-based (as represented by $LiMO_2$, where M is a metal such as $LiCoO_2$, $LiNiO_2$, $LiMnO_2$, or $LiNi_xCo_yMn_zO_2$ (where x, y, and z represent composition ratios)), olivine-based (as represented by $LiMPO_4$, where M is a metal such as $LiFePO_4$), and spinel-based (as represented by $LiM_2O_4$, where M is a metal such as $LiMn_2O_4$) complex metal chalcogen compounds are preferable, and these chalcogen compounds may be mixed as necessary.

The positive electrode active material layer may further contain a conductivity agent and/or a binder. Examples of conductivity agents include acetylene black, Ketjen black, and carbon fibers. The content of the conductivity agent is not limited but may be from 0.5 to 15 wt. %, for example. An example of a binder is a fluorine-containing binder such as PTFE or PVDF. The content of the conductivity agent is not limited but may be from 0.5 to 15 wt. %, for example. The thickness of the positive electrode active material layer is not limited but is within the range of from 0.1 μm to 1,000 μm, for example. The preparation method for the positive electrode active material layer is not particularly limited, but the positive electrode active material layer can be produced by mixing the positive electrode active material, the solid electrolyte material, and a conductivity agent and/or a binder as necessary and then pressure-molding the mixture. The positive electrode active material layer can also be produced by mixing the positive electrode active material, the solid electrolyte material, and a conductivity agent and/or a binder as necessary into a specific solvent to form a slurry and applying, drying, and then pressure-molding the mixture.

The positive electrode active material layer ordinarily has a current collector. SUS, aluminum, nickel, iron, titanium, and carbon, for example, can be used as a positive electrode current collector, and of these, aluminum or SUS is preferable.

(Solid Electrolyte Layer)

The solid electrolyte layer contains the solid electrolyte described in the section "[1] Production method for a negative electrode for an all-solid-state battery" above.

The content of the solid electrolyte with respect to the solid electrolyte layer is not particularly limited but may be from 10 vol. % to 100 vol. %, for example, and is preferably from 50 vol. % to 100 vol. %.

The thickness of the solid electrolyte layer is also not particularly limited but may be from 0.1 μm to 1,000 μm, for example, and is preferably from 0.1 μm to 300 μm.

The preparation method for the solid electrolyte layer is not particularly limited, but the solid electrolyte layer can be produced by a gas phase method or a pressure molding method. The gas phase method is not limited, but a vacuum deposition method, a pulse laser deposition method, a laser abrasion method, an ion plating method, or a sputtering method may be used. As a pressure molding method, the solid electrolyte layer can be produced by mixing the solid electrolyte and a conductivity agent and/or a binder as necessary and pressure-molding the mixture. The solid electrolyte material layer can also be produced by mixing the solid electrolyte material and a conductivity agent and/or a binder as necessary into a specific solvent to form a slurry and applying, drying, and then pressure-molding the mixture.

(Production Method)

The production method of the all-solid-state battery is not particularly limited, and a known production method for an all-solid-state battery may be used. For example, an all-solid-state battery can be obtained by pressure-molding a mixture prepared by mixing the material constituting the negative electrode for an all-solid-state battery according to the present invention as a negative electrode active material layer, the material constituting the positive electrode active material layer, and the material constituting the solid electrolyte layer. The order of pressure molding is not particularly limited, but examples include an order of the negative electrode active material layer, the solid electrolyte layer, and then the positive electrode active material layer, an order of the positive electrode active material layer, the solid electrolyte layer, and then the negative electrode active material layer, an order of the solid electrolyte layer, the negative electrode active material layer, and then the positive electrode active material layer, and an order of the solid electrolyte layer, the positive electrode active material layer, and then the negative electrode active material layer. Each layer of the solid electrolyte layer may also be compression-molded after being formed by the gas phase method described below.

EXAMPLES

The present invention will be described in detail hereafter using working examples, but these working examples do not limit the scope of the present invention.

The measurement methods for the physical properties of the carbonaceous material for a nonaqueous electrolyte secondary battery according to the present invention (the "average surface spacing $d_{(002)}$ of the (002) surface and crystallite thickness $L_{c(002)}$ in the c-axis direction according to an X-ray diffraction method", the "specific surface area", the "true density determined by a butanol method", the "average particle size according to a laser diffraction method", and "differential thermal analysis") will be described hereinafter, but the physical properties described in this specification, including those in the working examples, are based on values determined by the following methods.

(Average Surface Spacing $d_{(002)}$ of the (002) Surface and Crystallite Thickness $L_{c(002)}$ of the Carbonaceous Material)

A sample holder was filled with a carbonaceous material powder, and measurements were performed with a symmetrical reflection method using an X'Pert PRO manufactured by the PANalytical B.V. Under conditions with a scanning range of $8<2\theta<50°$ and an applied current/applied voltage of 45 kV/40 mA, an X-ray diffraction pattern was obtained using CuKα rays (λ=1.5418 A) monochromated by an Ni filter as a radiation source. The correction of the diffraction pattern was not performed for the Lorentz polarization factor, absorption factor, or atomic scattering factor, and the diffraction angle was corrected using the diffraction line of the (111) surface of a high-purity silicon powder serving as a standard substance. The wavelength of the CuKα rays was set to 0.15418 nm, and $d_{(002)}$ was calculated by Bragg's equation $d_{(002)}=\lambda/2\cdot\sin\theta$. In addition, the thickness $L_{c(002)}$ of crystallites in the c-axis direction was calculated with Scherrer's formula $L_{c(002)}=K\lambda/(\beta_{1/2}\cdot\cos\theta)$ from a value β determined by subtracting the half width of the (111) diffraction line of the silicon powder from the half width determined by a peak top method of the (002) diffraction line (setting the peak spread to 2θ corresponding to the value of half of the peak strength). Here, calculations were made using the shape factor K=0.9.

(Specific Surface Area)

The specific surface area was measured in accordance with the method prescribed in JIS Z8830. A summary is given below.

A value $v_m$ was determined by a one-point method (relative pressure x=0.2) based on nitrogen adsorption at the temperature of liquid nitrogen using the approximation $v_m=1/(v(1-x))$ derived from the BET equation, and the specific area of the sample was calculated from the following formula:

specific area=4.35×$v_m$ (m²/g)

(Here, $v_m$ is the amount of adsorption (cm³/g) required to form a monomolecular layer on the sample surface; v is the amount of adsorption (cm³/g) actually measured, and x is the relative pressure).

Specifically, the amount of adsorption of nitrogen in the carbonaceous substance at the temperature of liquid nitrogen was measured as follows using a "Flow Sorb II2300" manufactured by MICROMERITICS.

A test tube was filled with the carbon material, and the test tube was cooled to −196° C. while infusing helium gas containing nitrogen gas at a concentration of 20 mol % so that the nitrogen was adsorbed in the carbon material. Next, the test tube was returned to room temperature. The amount of nitrogen desorbed from the sample at this time was measured with a thermal conductivity detector and used as the adsorption gas amount v.

(True Density Determined by Butanol Method)

Measurements were performed using butanol in accordance with the method prescribed in JIS R7212. A summary is given below.

The mass ($m_1$) of a pycnometer with a bypass line having an internal volume of approximately 40 mL was precisely measured. Next, after a sample was placed flat at the bottom of the pycnometer so as to have a thickness of approximately 10 mm, the mass ($m_2$) was precisely measured. Next, 1-butanol was slowly added to the pycnometer to a depth of approximately 20 mm from the bottom. Next, the pycnometer was gently oscillated, and after it was confirmed that no large air bubbles were formed, the pycnometer was placed in a vacuum desiccator and gradually evacuated to a pressure of 2.0 to 2.7 kPa. The pressure was maintained for 20 minutes or longer, and after the generation of air bubbles stopped, the bottle was removed and further filled with 1-butanol. After a stopper was inserted, the bottle was immersed in a constant-temperature bath (adjusted to 30±0.03° C.) for at least 15 minutes, and the liquid surface of 1-butanol was aligned with the marked line. Next, the pycnometer was removed, and after the outside of the pycnometer was thoroughly wiped and the pycnometer was cooled to room temperature, the mass ($m_4$) was precisely measured. Next, the same pycnometer was filled with 1-butanol alone and immersed in a constant-temperature water bath in the same manner as described above. After the marked line was aligned, the mass ($m_3$) was measured. In addition, distilled water which was boiled immediately before use and from which the dissolved gas was removed was placed in the pycnometer and immersed in a constant-temperature water bath in the same manner as described above. After the marked line was aligned, the mass ($m_5$) was measured. The true density ($\rho_{Bt}$) is calculated using the following formula.

$$\rho_{Bt} = \frac{m_2 - m_1}{m_2 - m_1 - (m_4 - m_3)} \times \frac{m_3 - m_1}{m_5 - m_1} d \quad \text{[Formula 1]}$$

(Here, d is the specific gravity (0.9946) in water at 30° C.)

(Average Particle Size)

Three drops of a dispersant (cationic surfactant "SN-WET 366" (manufactured by the San Nopco Co.)) were added to approximately 0.1 g of a sample, and the dispersant was blended into the sample. Next, 30 mL of purified water was added, and after the sample was dispersed for approximately 2 minutes with an ultrasonic washer, the particle size distribution within the particle size range of 0.05 to 3,000 μm was determined with a particle size distribution measurement device ("SALD-3000J" manufactured by the Shimadzu Corporation).

The average particle size $D_{v50}$ (μm) was determined from the resulting particle size distribution as the particle size yielding a cumulative volume of 50%.

(Differential Thermal Analysis)

Differential thermal analysis was performed under a dry air flow using a DTG-60H manufactured by the Shimadzu Corporation. The analysis conditions were such that a 2 mg sample was analyzed under a 100 mL/min air flow at a heating rate of 10° C./min. The exothermic peak temperature was read from the differential thermal curve.

Production Example 1

First, 70 kg of a petroleum pitch with a softening point of 205° C., an H/C atomic ratio of 0.65, and a quinoline insoluble content of 0.4% and 30 kg of naphthalene were charged into a pressure-resistant container with an internal volume of 300 liters and having a stirring blade and an outlet nozzle, and the substances were melted and mixed for one to two hours while heating at 190° C. The heat-melted and mixed petroleum pitch was then cooled to approximately 100° C., and the inside of the pressure-resistant container was pressurized by nitrogen gas. The content was extruded from the outlet nozzle to obtain a string-shaped compact with a diameter of approximately 500 μm. Next, this string-shaped compact was pulverized so that the ratio (L/D) of the diameter (D) and the length (L) was approximately 1.5 to 2.0, and the resulting pulverized product was added to an aqueous solution in which 0.53 mass % of polyvinyl alcohol (degree of saponification: 88%) heated to 93° C. is dissolved, dispersed while stirring, and cooled to obtain a spherical pitch compact slurry. After most of the water was removed by filtration, the naphthalene in the pitch compact was extracted with n-hexane with a weight approximately six times that of the spherical pitch compact and removed. Using a fluidized bed, the porous spherical pitch obtained in this manner was heated to 260° C. and held for one hour at 260° C. while hot air was passed through to oxidize, thereby producing heat-infusible porous spherical oxidized pitch.

Next, 100 g of the oxidized pitch was placed in a vertical tubular furnace with an inside diameter of 50 mm and a height of 900 mm, and this was heated to 550° C. while infusing nitrogen gas at atmospheric pressure from the lower part of the device at a flow rate of 5 NL/min. This was held for one hour at 550° C. and subjected to pre-calcination to obtain a carbonaceous material precursor. Next, 200 g of the obtained carbonaceous material precursor pitch was pulverized for 20 minutes with a jet mill (AIR JET MILL manufactured by Hosokawa Micron Co., Ltd.; MODEL 100AFG) at a pulverization pressure of 4.0 kgf/cm² and a rotor revolution speed of 4,500 rpm to form a pulverized carbon precursor. The jet mill that was used was equipped with a classifier. Next, 10 g of the pulverized carbonaceous material precursor was placed in a horizontal tubular furnace with a diameter of 100 mm and heated to 1,200° C. at a heating rate of 250° C./h. This was held for one hour at 1,200° C. and subjected to main calcination to prepare a carbonaceous material 1. Main calcination was performed in a nitrogen atmosphere with a flow rate of 10 L/min.

The physical properties of the obtained carbonaceous material 1 included a specific surface area of 2.9 m$^2$/g, an average particle size of 21.0 μm, a $d_{(002)}$ of 0.386 nm, a $L_{c(002)}$ of 1.1 nm, a $\rho_{Bt}$ of 1.52 g/cm$^3$, an exothermic peak temperature T of 654° C., and a T−100×$\rho_{Bt}$ of 502.

Production Example 2

(1) Phenol Resin Production

First, 32 g of paraformaldehyde, 242 g of ethylcellosolve, and 10 g of sulfuric acid were added to 108 g of o-cresol, and after the mixture was reacted for three hours at 115° C., the reaction solution was neutralized by adding 17 g of sodium hydrogen carbonate and 30 g of water. The obtained reaction solution was charged into 2 liters of water stirred at a high speed to obtain a novolac resin. Next, 17.3 g of the novolac resin and 2.0 g of hexamine were kneaded at 120° C. and heated for two hours at 250° C. in a nitrogen gas atmosphere to form a cured resin.

(2) Production of a Carbonaceous Material

After the obtained cured resin was roughly pulverized, the resin was subjected to pre-calcination for one hour at 600° C. in a nitrogen atmosphere (atmospheric pressure) and further heat-treated for one hour at 1,200° C. in an argon gas atmosphere (atmospheric pressure) to obtain a carbonaceous material. The obtained carbonaceous material was further pulverized to obtain a carbonaceous material 2.

The physical properties of the obtained carbonaceous material 2 included a specific surface area of 0.3 m$^2$/g, an average particle size of 22.8 μm, a $d_{(002)}$ of 0.393 nm, a $L_{c(002)}$ of 1.1 nm, a $\rho_{Bt}$ of 1.41 g/cm$^3$, an exothermic peak temperature T of 639° C., and a T−100×$\rho_{Bt}$ of 498.

Production Example 3

A carbonaceous material 3 was obtained by repeating the operations of Production Example 1 with the exception that in the oxidation of the porous spherical pitch, the temperature of the heating air was set to 165° C. and held for one hour.

The physical properties of the obtained carbonaceous material 3 included a specific surface area of 3.9 m$^2$/g, an average particle size of 19.5 μm, a $d_{(002)}$ of 0.357 nm, a $L_{c(002)}$ of 1.8 nm, a $\rho_{Bt}$ of 1.97 g/cm$^3$, an exothermic peak temperature T of 748° C., and a T−100×$\rho_{Bt}$ of 551.

Working Example 1

In this working example, a negative electrode for an all-solid-state battery was produced by coating the carbonaceous material 2 with polyethylene glycol using a sol-gel method as an alternative solid electrolyte.

Specifically, the carbonaceous material 2 and polyethylene glycol were measured so that the weight ratio was 90:10 and the volume ratio was 84:16. The measured polyethylene glycol was dissolved in a mixed solvent of 10 g of methanol and water. Next, the carbonaceous material 2 was dispersed in the solvent, and methanol was removed using a rotary evaporator. The obtained powder was dried for eight hours at 60° C. in a vacuum to obtain a negative electrode 1. The electrode deformation ratio and the physical properties of only the carbonaceous material 2 obtained by removing the coated product after coating treatment are shown in Table 1.

Working Example 2

A negative electrode 2 was obtained by repeating the operations of Working Example 1 with the exception that the amounts of the carbonaceous material 2 and the alternative solid electrolyte were set to a weight ratio of 70:30 and a volume ratio of 65:35. The electrode deformation ratio and the physical properties of only the carbonaceous material 2 obtained by removing the coated product after coating treatment are shown in Table 1.

Working Example 3

A negative electrode 3 was obtained by repeating the operations of Working Example 1 with the exception that potassium bromide (KBr) was used as an alternative solid electrolyte, that the carbonaceous material 1 obtained in Production Example 1 was used as a carbonaceous material, and that the amounts of the carbonaceous material 1 and the alternative solid electrolyte were set to a weight ratio of 50:50 and a volume ratio of 65:35. The electrode deformation ratio and the physical properties of only the carbonaceous material 1 obtained by removing the coated product after coating treatment are shown in Table 2.

Working Example 4

In this working example, a negative electrode for an all-solid-state battery was produced by mixing KBr as an alternative solid electrolyte into the carbonaceous material 1 obtained in Production Example 1 using a ball mill.

Specifically, the carbonaceous material 1 and KBr were measured so that the weight ratio was 50:50 and the volume ratio was 65:35. 4 mL of zirconia balls with a diameter of 2 mm were charged into a zirconia pot with a volume of 12 mL. Next, the measured powder was placed in the container and mixed for one hour at a revolution speed of 600 rpm using a ball mill (P-6 manufactured by FRITSCH) to obtain a negative electrode 4. The electrode deformation ratio and the physical properties of only the carbonaceous material 1 obtained by removing the coated product after coating treatment are shown in Table 2.

Working Example 5

A negative electrode 5 was obtained by repeating the operations of Working Example 4 with the exception that the mixing time with the ball mill was set to three hours. The electrode deformation ratio and the physical properties of only the carbonaceous material 1 obtained by removing the coated product after coating treatment are shown in Table 2.

Working Example 6

A negative electrode 6 was obtained by repeating the operations of Working Example 4 with the exception that the mixing time with the ball mill was set to five hours. The electrode deformation ratio and the physical properties of only the carbonaceous material 1 obtained by removing the coated product after coating treatment are shown in Table 2.

Working Example 7

In this working example, a negative electrode 7 was obtained by repeating the operations of Working Example 4 with the exception that the carbonaceous material 3 obtained in Production Example 3 was used. The electrode deformation ratio and the physical properties of only the carbonaceous material 3 obtained by removing the coated product after coating treatment are shown in Table 3.

Comparative Example 1

In this comparative example, a negative electrode for an all-solid-state battery was produced by mixing polyethylene glycol as an alternative solid electrolyte into the carbonaceous material 2 obtained in Production Example 2 using a ball mill.

Specifically, the carbonaceous material 2 and polyethylene glycol were measured so that the weight ratio was 90:10 and the volume ratio was 84:16. 4 mL of zirconia balls with a diameter of 2 mm were charged into a zirconia pot with a volume of 12 mL. Next, the measured powder was placed in the container and mixed for 20 minutes at a revolution speed of 150 rpm using a ball mill (P-6 manufactured by FRITSCH) to obtain a comparative negative electrode 1. The electrode deformation ratio and the physical properties of only the carbonaceous material 2 obtained after treatment are shown in Table 1.

Comparative Example 2

A comparative negative electrode 2 was obtained by repeating the operations of Comparative Example 1 with the exception that the amounts of the carbonaceous material 2 and the alternative solid electrolyte were set to a weight ratio of 70:30 and a volume ratio of 65:35. The electrode deformation ratio and the physical properties of only the carbonaceous material 2 obtained after treatment are shown in Table 1.

Comparative Example 3

A comparative negative electrode 3 was obtained by repeating the operations of Comparative Example 1 with the exception that potassium bromide (KBr) was used as an alternative solid electrolyte, that the carbonaceous material 1 obtained in Production Example 1 was used as a carbonaceous material, and that the amounts of the carbonaceous material 1 and the alternative solid electrolyte were set to a weight ratio of 50:50 and a volume ratio of 65:35. The electrode deformation ratio and the physical properties of only the carbonaceous material 1 obtained after treatment are shown in Table 2.

Comparative Example 4

A comparative negative electrode 4 was obtained by repeating the operations of Comparative Example 1 with the exception that the carbonaceous material 3 obtained in Production Example 3 was used, that potassium bromide (KBr) was used as an alternative solid electrolyte, and that the amounts of the carbonaceous material 3 and the alternative solid electrolyte were set to a weight ratio of 50:50 and a volume ratio of 65:35. The electrode deformation ratio and the physical properties of only the carbonaceous material 3 obtained after treatment are shown in Table 3.

(Electrode Deformation Ratio)

First, 0.65 mL of a sample is placed in a φ10 and 3 cm tall cylindrical container, and pressure is applied from above with a φ10 cylindrical rod. The pressure is applied from 0 to 400 MPa. At this time, the height to the top of the rod at the time of 400 MPa of pressure is defined as A. The pressure is gradually released thereafter, and the height to the top of the rod at the time of 0 MPa is defined as B. The electrode deformation ratio is calculated with the following formula.

$$\text{Electrode deformation ratio} = [(B/A) \times 100] - 100$$

TABLE 1

| | Alternative solid electrolyte | Weight ratio | | Volume ratio | | Specific surface area Carbonaceous material 2 after treatment m²/g | $D_{v50}$ Carbonaceous material 2 after treatment μm | $d_{(002)}$ Carbonaceous material 2 after treatment nm |
|---|---|---|---|---|---|---|---|---|
| | | Carbonaceous material 2 wt % | Alternative solid electrolyte wt % | Carbonaceous material 2 vol % | Alternative solid electrolyte vol % | | | |
| Working Example 1 | PEG | 90 | 10 | 84 | 16 | 0.3 | 22.8 | 0.393 |
| Comparative Example 1 | PEG | 90 | 10 | 84 | 16 | 0.3 | 22.8 | 0.393 |
| Working Example 2 | PEG | 70 | 30 | 65 | 35 | 0.3 | 22.8 | 0.393 |
| Comparative Example 2 | PEG | 70 | 30 | 65 | 35 | 0.3 | 22.8 | 0.393 |

| | $L_{c(002)}$ Carbonaceous material 2 after treatment nm | $\rho_{Bt}$ Carbonaceous material 2 after treatment g/cm³ | Exothermic peak temperature T Carbonaceous material 2 after treatment °C | $T - 100 \times \rho_{Bt}$ Carbonaceous material 2 after treatment | Mixed electrode | | |
|---|---|---|---|---|---|---|---|
| | | | | | At 400 MPa Electrode height A cm | At 0 MPa Electrode height B cm | Electrode deformation ratio [(B/A) × 100] − 100 % |
| Working Example 1 | 1.1 | 1.41 | 639 | 498 | 0.8530 | 1.0094 | 18.3 |
| Comparative Example 1 | 1.1 | 1.41 | 639 | 498 | 0.8814 | 1.0885 | 23.5 |

TABLE 1-continued

| | | | | | | | |
|---|---|---|---|---|---|---|---|
| Working Example 2 | 1.1 | 1.41 | 639 | 498 | 0.7868 | 0.8588 | 9.2 |
| Comparative Example 2 | 1.1 | 1.41 | 639 | 498 | 0.8130 | 0.9188 | 13.0 |

TABLE 2

| | Alternative solid electrolyte | Weight ratio | | Volume ratio | | Specific surface area Carbonaceous material 1 after treatment m²/g | $D_{v50}$ Carbonaceous material 1 after treatment μm | $d_{(002)}$ Carbonaceous material 1 after treatment nm |
|---|---|---|---|---|---|---|---|---|
| | | Carbonaceous material 1 wt % | Alternative solid electrolyte wt % | Carbonaceous material 1 vol % | Alternative solid electrolyte vol % | | | |
| Working Example 3 | KBr | 50 | 50 | 65 | 35 | 2.9 | 21.0 | 0.386 |
| Working Example 4 | KBr | 50 | 50 | 65 | 35 | 5.3 | 8.8 | 0.386 |
| Working Example 5 | KBr | 50 | 50 | 65 | 35 | 17.6 | 2.2 | 0.386 |
| Working Example 6 | KBr | 50 | 50 | 65 | 35 | 33.5 | 1.0 | 0.386 |
| Comparative Example 3 | KBr | 50 | 50 | 65 | 35 | 2.9 | 21.0 | 0.386 |

| | $L_{c(002)}$ Carbonaceous material 1 after treatment nm | $\rho_{Bt}$ Carbonaceous material 1 after treatment g/cm³ | Exothermic peak temperature T Carbonaceous material 1 after treatment °C. | $T - 100 \times \rho_{Bt}$ Carbonaceous material 1 after treatment | Mixed electrode | | Electrode deformation ratio $[(B/A) \times 100] - 100$ % |
|---|---|---|---|---|---|---|---|
| | | | | | At 400 MPa Electrode height A cm | At 0 MPa Electrode height B cm | |
| Working Example 3 | 1.1 | 1.52 | 654 | 502 | 0.9588 | 1.0798 | 12.6 |
| Working Example 4 | 1.1 | 1.52 | 648 | 496 | 0.9282 | 1.0628 | 14.5 |
| Working Example 5 | 1.1 | 1.52 | 645 | 493 | 0.9088 | 1.0222 | 12.5 |
| Working Example 6 | 1.1 | 1.52 | 643 | 491 | 0.9288 | 1.0386 | 11.8 |
| Comparative Example 3 | 1.1 | 1.52 | 654 | 502 | 0.9792 | 1.1360 | 16.0 |

TABLE 3

| | Alternative solid electrolyte | Weight ratio | | Volume ratio | | Specific surface area Carbonaceous material 3 after treatment m²/g | $D_{v50}$ Carbonaceous material 3 after treatment μm | $d_{(002)}$ Carbonaceous material 3 after treatment nm |
|---|---|---|---|---|---|---|---|---|
| | | Carbonaceous material 3 wt % | Alternative solid electrolyte wt % | Carbonaceous material 3 vol % | Alternative solid electrolyte vol % | | | |
| Working Example 7 | KBr | 57 | 43 | 65 | 35 | 8.0 | 4.9 | 0.357 |
| Comparative Example 4 | KBr | 57 | 43 | 65 | 35 | 3.9 | 19.5 | 0.357 |

| | $L_{c(002)}$ Carbonaceous material 3 after | $\rho_{Bt}$ Carbonaceous material 3 after | Exothermic peak temperature T Carbonaceous material 3 after | $T - 100 \times \rho_{Bt}$ Carbonaceous material | Mixed electrode | | Electrode deformation ratio $[(B/A) \times 100] -$ |
|---|---|---|---|---|---|---|---|
| | | | | | At 400 MPa Electrode | At 0 MPa Electrode | |

TABLE 3-continued

|  | treatment nm | treatment g/cm³ | treatment ° C. | 3 after treatment | height A cm | height B cm | 100 % |
|---|---|---|---|---|---|---|---|
| Working Example 7 | 1.8 | 1.97 | 744 | 547 | 0.8698 | 0.9940 | 14.0 |
| Comparative Example 4 | 1.8 | 1.97 | 748 | 551 | 0.8950 | 1.0394 | 16.1 |

INDUSTRIAL APPLICABILITY

With the production method for a negative electrode for an all-solid-state battery according to the present invention, it is possible to obtain a negative electrode for an all-solid-state battery exhibiting excellent battery performance. In addition, the negative electrode for an all-solid-state battery and an all-solid-state battery containing the same according to the present invention can be suitably used in hybrid electric vehicles (HEVs), plug-in hybrid electric vehicles (PHEVs), and electric vehicles (EVs).

The present invention has been described above using specific modes of embodiment, but modifications and improvements apparent to persons having ordinary skill in the art are also included in the scope of the present invention.

The invention claimed is:

1. A production method for a negative electrode for an all-solid-state battery comprising the steps of:
 (1) coating a carbonaceous material having a true density of from 1.30 g/cm³ to 2.10 g/cm³ determined by a butanol method with a solid electrolyte; and
 (2) pressure-molding the solid electrolyte-coated carbonaceous material,
 wherein the carbonaceous material has an average surface spacing of a (002) surface of from 0.340 to 0.400 nm determined by powder X-ray diffraction, a $L_{c(002)}$ of from 0.5 to 10 nm, and an average particle size $D_{v50}$ of from 1 to 50 μm, and
 wherein the carbonaceous material is a carbonaceous material having an exothermic peak temperature T (° C.) according to differential thermal analysis and a butanol true density $\rho_{Bt}$ (g/cm³) satisfying the following formula (1):

$$300 \leq T - 100 \times \rho_{Bt} \leq 650 \tag{1}$$

2. The production method for a negative electrode for an all-solid-state battery according to claim 1, wherein a volume ratio of the carbonaceous material and the solid electrolyte is from 20:80 to 99:1.

3. A negative electrode for an all-solid-state battery obtained by the production method described in claim 1.

4. An all-solid-state battery containing the negative electrode for an all-solid-state battery described in claim 3.

* * * * *